US012504160B2

(12) United States Patent
Balian et al.

(10) Patent No.: US 12,504,160 B2
(45) Date of Patent: Dec. 23, 2025

(54) LUMINAIRE WITH SOCKET WITH PREVENTION OF WATER INGRESS

(71) Applicant: SIGNIFY HOLDING B.V., Eindhoven (NL)

(72) Inventors: Ara Balian, Montreal (CA); Sergio Fabian Jurdana, Blainville (CA); Jean-Francois Laporte, Mascouche (CA); Alexandre Plomteux, Montreal (CA)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/658,768

(22) Filed: May 8, 2024

(65) Prior Publication Data

US 2024/0410561 A1 Dec. 12, 2024

Related U.S. Application Data

(60) Provisional application No. 63/532,551, filed on Aug. 14, 2023, provisional application No. 63/471,987, filed on Jun. 9, 2023.

(51) Int. Cl.
*F21V 31/00* (2006.01)
*F21V 23/06* (2006.01)

(52) U.S. Cl.
CPC ............ *F21V 31/005* (2013.01); *F21V 23/06* (2013.01)

(58) Field of Classification Search
CPC ............................... F21V 31/005; F21V 23/06
See application file for complete search history.

(56) References Cited

U.S. PATENT DOCUMENTS

| | | | | |
|---|---|---|---|---|
| 7,723,862 | B1 * | 5/2010 | Spillman | H05B 47/20 307/11 |
| 9,638,405 | B2 * | 5/2017 | Hobson | F21V 23/0464 |
| 10,873,170 | B2 * | 12/2020 | Zimmerman, III | H05B 47/19 |
| 11,187,404 | B2 * | 11/2021 | Howard | H01R 33/965 |
| 11,375,599 | B2 * | 6/2022 | Vendetti | F21V 23/045 |
| 2013/0040471 | A1 * | 2/2013 | Gervais | H05B 47/11 439/56 |
| 2013/0279172 | A1 * | 10/2013 | Wang | F21V 29/74 362/373 |
| 2017/0311424 | A1 * | 10/2017 | Vendetti | H05B 45/12 |
| 2017/0336061 | A1 * | 11/2017 | Riedel | H02M 7/02 |
| 2019/0350065 | A1 | 11/2019 | Stuby, Jr. et al. | |
| 2022/0120423 | A1 * | 4/2022 | Jeswani | F21V 23/0435 |

FOREIGN PATENT DOCUMENTS

| | | | |
|---|---|---|---|
| CN | 105674150 | A | 6/2016 |
| WO | 2013159833 | A1 | 10/2013 |
| WO | 2020144272 | A1 | 7/2020 |

* cited by examiner

*Primary Examiner* — Tsion Tumebo

(57) ABSTRACT

According to certain embodiments, an apparatus comprises a housing including a cavity; a socket disposed in the cavity, wherein the socket makes direct contact with a portion of the housing surrounding the cavity; a surge protector disposed on the socket, wherein the surge protector comprises a male interface plugged into the socket, and female interface; and a photocell plugged into the female interface.

9 Claims, 5 Drawing Sheets

LUMINAIRE WITH SOCKET WITH PREVENTION OF WATER INGRESS

BACKGROUND

1. Field

This disclosure relates to luminaires. More particularly, this disclosure relates to luminaires with sockets that prevent water ingress.

2. Description of the Related Art

Outdoor luminaires can use a National Electronics Manufacturers Association (NEMA) socket, or other standard socket, to install other external electronic devices. Some examples of external devices to be installed using a NEMA socket are photocell controls, shorting caps, and control devices with multiples functions. However, water ingress can cause deterioration of the luminaire. For example, damage from water ingress can occur from loss of torque with the installation screws, and deformation of certain parts. This can be particularly acute for IP66 rated luminaires. A vacuum generated inside the luminaire, as a result of the temperature between the inside of the luminaire and the outside of the luminaire, can create a suction force for water on the external surface of the luminaire.

Conventional NEMA sockets are installed externally on to luminaires. NEMA sockets are generally composed of several parts including electrical connections for controls, two screws for mechanical fixation and a gasket as sealing interface with the luminaire. Some examples of external devices to be installed on this NEMA socket are photocell control, shorting caps, and control devices with multiples functions.

Conventional NEMA sockets include a sealing system to avoid water ingress inside luminaire. This system relies on NEMA plastic ring, gasket sealing, 2 screws and the torque applied to the screws. This type systems are prone to failures. For example, loss of installation screws torque or the NEMA socket may present deformations on the part itself. These failures can arrive more frequently if the luminaire is rated IP66.

It should be noted that the above information of the background is merely provided for clear and complete explanation of the disclosure and for easy understanding for those skilled in the art. No inference should be drawn that any of the above information is known to those skilled in the art.

SUMMARY

According to certain embodiments, an apparatus comprises a housing including a cavity; a socket disposed in the cavity, wherein the socket makes direct contact with a portion of the housing surrounding the cavity; a surge protector disposed on the socket, wherein the surge protector comprises a male interface plugged into the socket, and female interface; and a photocell plugged into the female interface.

According to certain embodiments, an apparatus comprises a housing with a cavity; a socket disposed in the cavity in direct contact with the housing, the socket including: a Zagha interface; and a Near Field Communication (NFC) circuit, configured to transmit and receive NFC signals; and a driver disposed in the housing, the driver connected to an NFC transceiver configured to transmit and receive signals from the NFC circuit of the socket.

BRIEF DESCRIPTION OF THE DRAWINGS

The above and other aspects, features, and advantages of certain embodiments of the disclosure will be more apparent from the following description taken in conjunction with the accompanying drawings, in which.

A brief description of each drawing is provided to better understand the drawings cited herein.

DETAILED DESCRIPTION

Certain embodiments reduce, if not, eliminate the risk of water infiltration caused by the NEMA (or other standard) socket interface with the luminaire. The NEMA external ring can be integrated into the luminaire. The luminaire can have a housing design that corresponds to the shape of the NEMA external ring and provide a seal to prevent water ingress without a gasket. Accordingly, the invention, may reduce the parts count, reduce, if not eliminate, the water ingress risk, allow for faster luminaire assembly, reduce luminaire cost, and allow for robotic assembly.

Figure 1A:
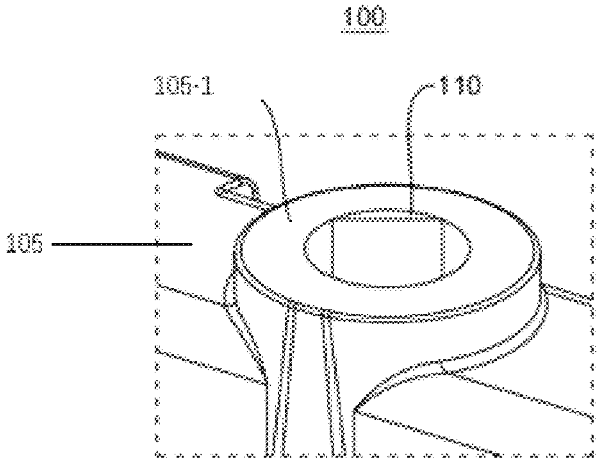
FIG. 1A illustrates a luminaire in accordance with an embodiment of the disclosure.
Figure 1B:
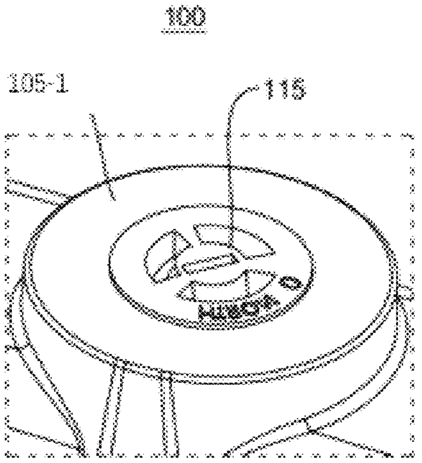
FIG. 1B illustrates a socket disposed in a cavity of a housing in accordance with an embodiment of the disclosure.

FIGS. 1A and 1B illustrates a luminaire 100 in accordance with an embodiment of the disclosure. The luminaire 100 includes a housing 105 with an integrated externally protruding ring 105-1 with a cavity 110. The cavity 110 is configured to facilitate insertion of a socket 115. The socket can include, but is not limited to a NEMA socket, or a Zagha socket. FIG. 1B shows the socket 115 disposed in the ring 105-1. The ring 105-1 may be molded such that the portion of the ring 105-1 surrounding the cavity 110 forms a direct contact with the socket 115, without a gasket.

Figure 1C:
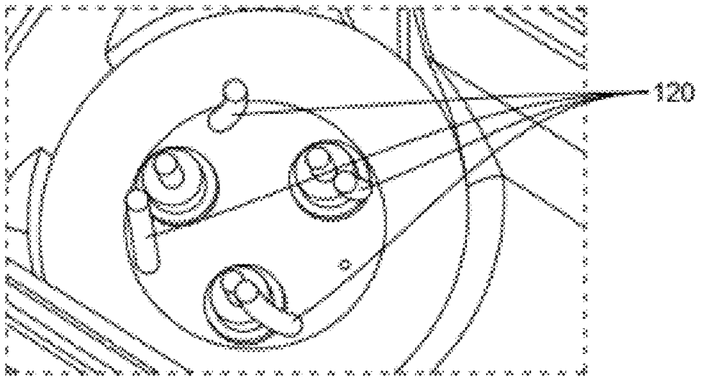
FIG. 1C illustrates an interior of a housing in accordance with an embodiment of the disclosure.

The ring 105-1 can be injection molded along with the housing 105. The socket 115 can be inserted into the cavity 110 by clipping, ultrasound, glue, or another mating system. For example, the socket 115 may have threads and the cavity 110 may have threads surrounding the cavity 110. Accordingly, the threads of the socket 115 can mate with the threads of the ring 105-1. The ring 105-1 can also include an interior cavity. For example, FIG. 1C shows the interior of the ring 105-1. The socket 115 may be connected to wires 120 inside the ring 105-1. The wires 120 may be connected to the socket 115 by push in installation. The interior cavity of the ring 105-1 can also receive electrical connectors that electrically relate the interface to other circuit modules.

Figure 2A:
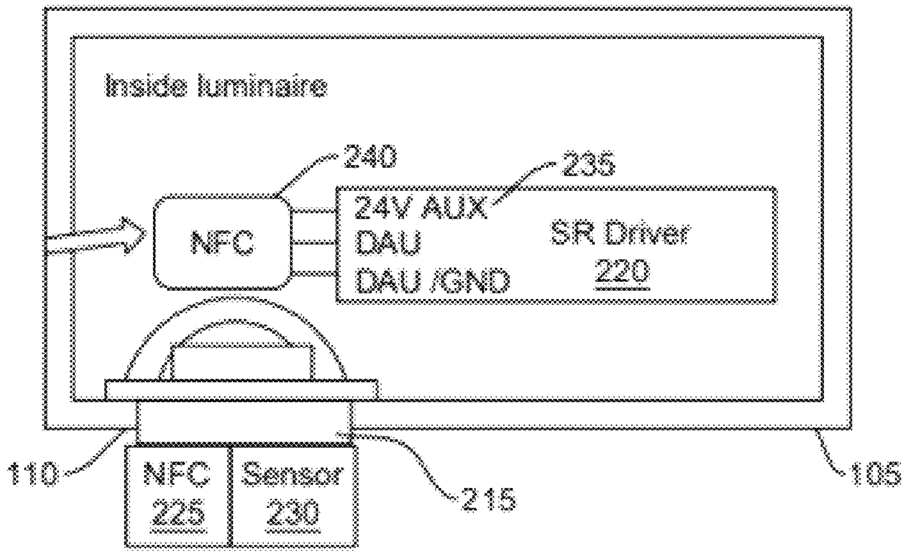
FIGS. 2A-2C illustrates a wireless socket in accordance with an embodiment of the disclosure.
Figure 2B:
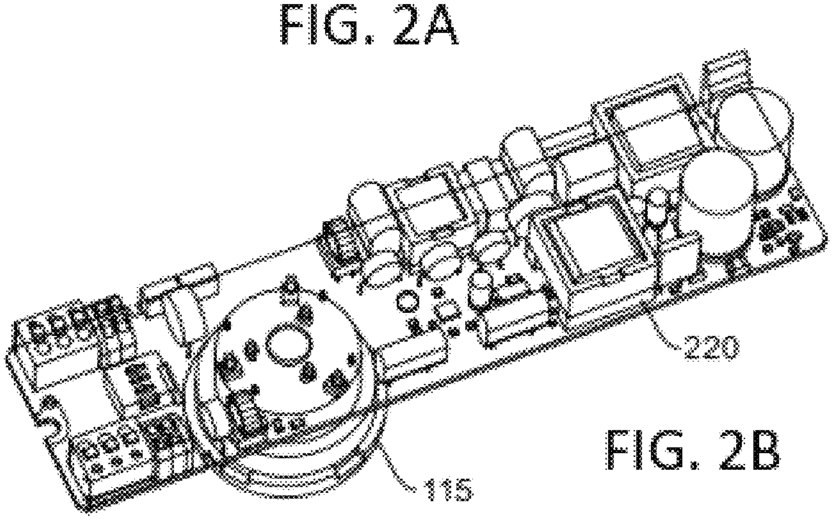
Figure 2C:
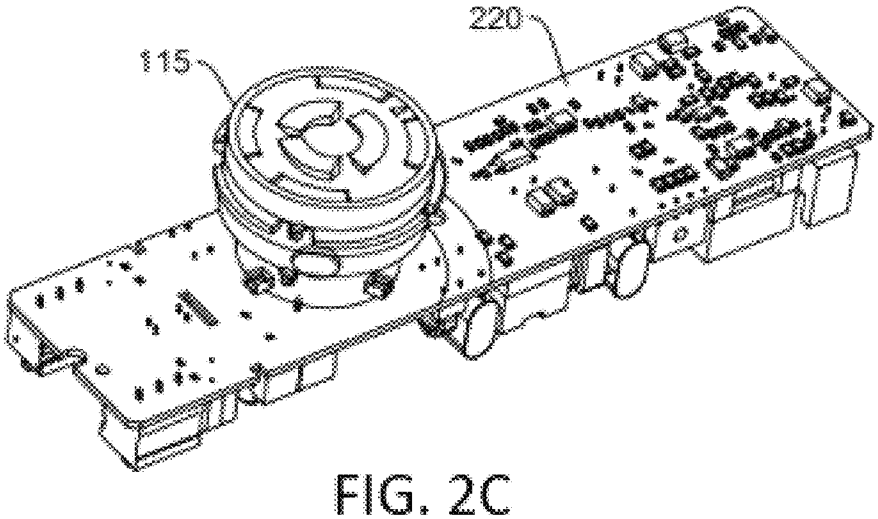

Referring now to FIGS. 2A-C, the socket 115 can comprise a wireless Zhaga Book 18 receptacle 215. The housing 105 can have disposed therein, a driver 220. The Zhaga Book 18 receptable 215 can wirelessly communicate and receive power from the driver 220 inside the housing 105. The Zhaga Book 18 receptacle 215 can screw into the cavity 110 and include a Near Field Communication (NFC) circuit. In certain embodiments, the NFC circuit 225 can be an integrated circuit or a chip.

The Zhaga Book 18 receptable 215 can also wirelessly communicate with a sensor 230 that is disposed onto the housing 105. In certain embodiments, the Zhaga Book 18 receptable 215 and the sensor 230 can be enclosed in a silicon potted enclosure to ensure its water resistance rating (IP rating).

The driver 220 can be connected to or include an NFC transceiver 240. The NFC transceiver 240 transmits the driver's 24V Auxiliary Power Supply Unit (PSU) and Digital Addressable Lighting Interface (DALI) signals 235 to power the sensor by induction. The NFC transceiver 240 can also decode NFC signals transmitted by the sensor 230 and transmit driver parameters that are requested by the sensor 230. The driver 220 may also include one or more processors connected to memory storing instructions that are executable by the one or more processors.

With a wireless Zhaga Book 18 receptacle 215, water ingress is avoided by screwing the sensor directly in the housing from outside and eliminating the need to drill a hole and passing the connector through with a gasket.

The use of a wireless Zhaga Book 18 receptable 215 allows for faster assembly time since there may be less wires to connect (decoder can either be directly attached to driver or implemented internally). Additionally, a mounting bracket may not be needed since the Zhaga Book 18 receptable 215 is screwed in directly to the luminaire housing.

A surge protector device (SPD) is a device made to protect the luminaire electronic circuit from unwanted power surges or spikes and can also protect against overvoltage events generated by lightning strikes or other events. The surge protector can be the first component receiving and filtering the main power voltage and current, and acts as a fuse to protect the luminaire.

After a power overcharge occurs, the SPD might fail to protect the luminaire. Thus, the SPD can be replaced to bring the luminaire to normal operation. If the SPD is disposed inside the luminaire housing, it is necessary to shut down the main power, open the luminaire to access the SPD device, and replace it. In some cases, electricians take out the NEMA photocell on top of the luminaire to shut down luminaire power.

Accordingly, in certain embodiments, the SPD module can be installed on the socket 115 and outside of the housing 105. The SPD module can also provide a standard connection (for example, a NEMA connection or a Zhaga connection) for installing other device with the same interfaces.

Accordingly, an SPD module can include a male interface to connect to the luminaire and a female interface to connect any additional standard device to the luminaire. Surge protector components and connections are integrated inside of the module and all electrical bridges connections to make it operational as a standard NEMA or Zagha socket.

Figure 3A:
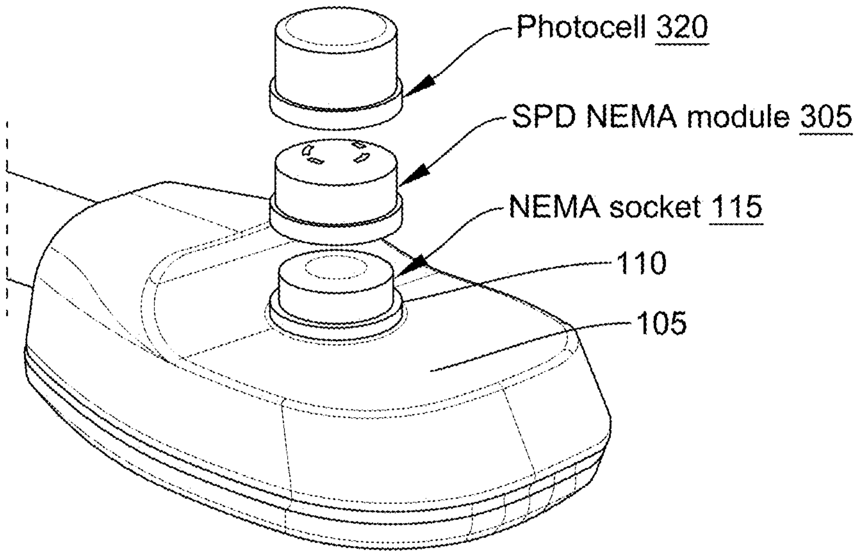
FIG. 3A illustrates a luminaire with a surge protector device (SPD) disposed outside the housing, in accordance with an embodiment of the disclosure.
Figure 3B:
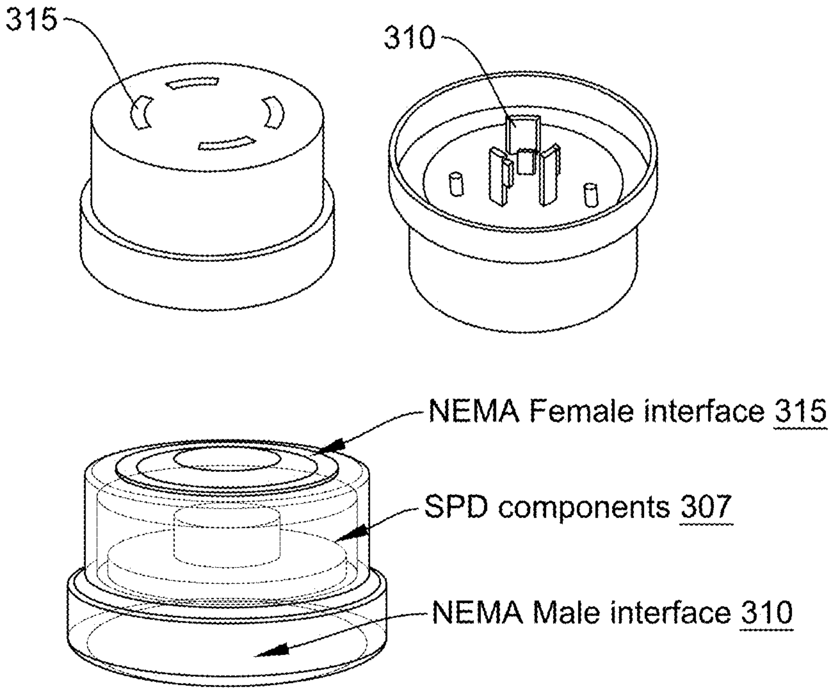
FIG. 3B illustrates an SPD having a NEMA interface, in accordance with an embodiment of the disclosure.

Referring now to FIGS. 3A and 3B, there is illustrated an SPD 305 having a NEMA interface, in accordance with an embodiment of the disclosure. FIG. 3A shows the luminaire with the SPD 305 disposed outside the ring 105-1. FIG. 3B shows the SPD 305 having a NEMA interface. The SPD 305 can include surge protector components 307. A NEMA socket 115 can be disposed in the cavity 110 of the ring 105-1. The SPD 305 has a NEMA male interface 310 and a NEMA female interface 315. The NEMA male interface 310 can be inserted into the NEMA socket 115. Accordingly, when the NEMA male interface 310 is inserted, the NEMA female interface 315 can receive a photocell 320.

Figure 4A:
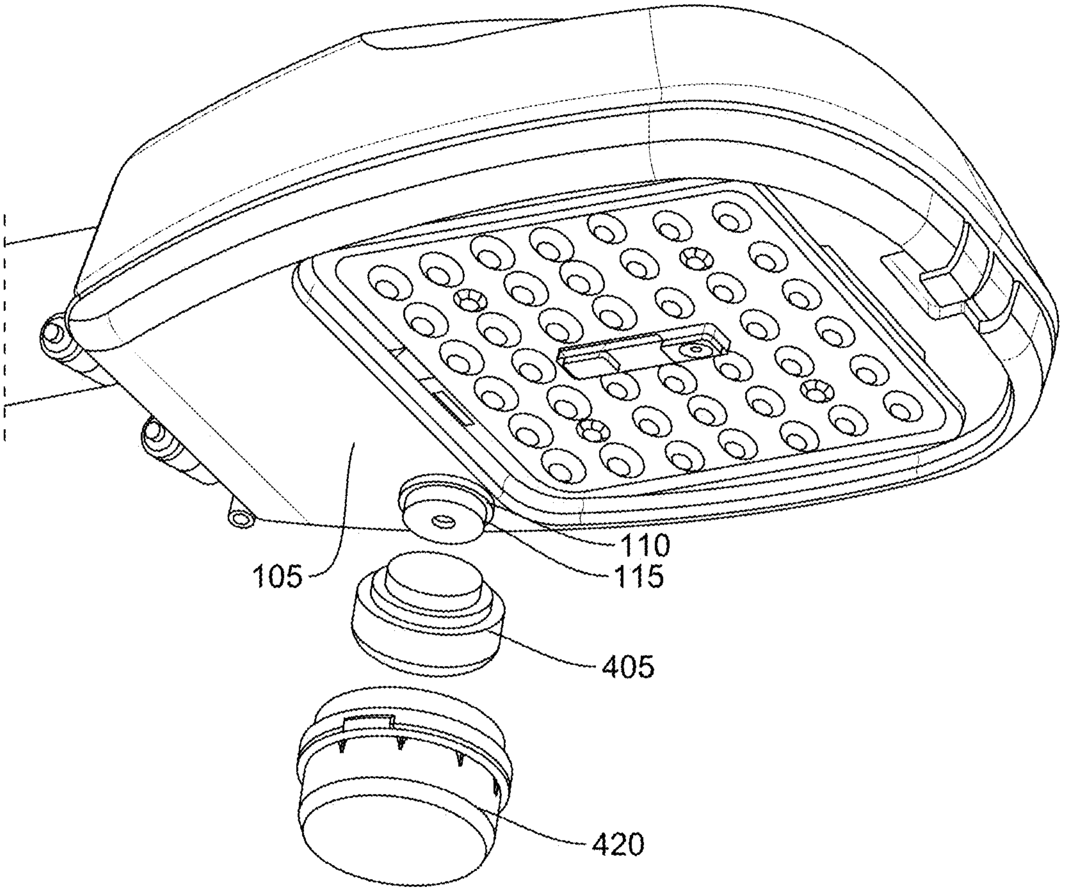
FIG. 4A illustrates a luminaire with an SPD disposed outside the housing, in accordance with an embodiment of the disclosure.
Figure 4B:
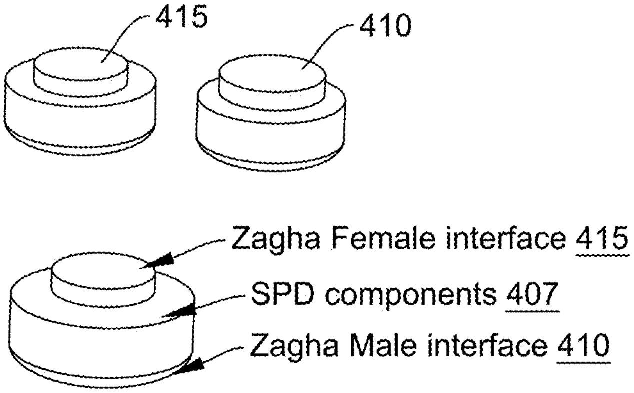
FIG. 4B illustrates an SPD having a Zagha interface, in accordance with an embodiment of the disclosure.

Referring now to FIGS. 4A and 4B, there is illustrated an SPD 405 having a Zagha interface, in accordance with an embodiment of the disclosure. FIG. 4A shows the luminaire with the SPD 405 disposed outside the ring 105-1. FIG. 4B shows the SPD 405 having a Zagha interface. The SPD 405 can include surge protector components 407. A Zagha socket 115 can be disposed in the cavity 110 of the ring 105-1. The SPD 405 has a Zagha male interface 410 and a Zagha female interface 415. The Zagha male interface 410 can be inserted into the Zagha socket 115. Accordingly, when the Zagha male interface 410 is inserted, the Zagha female interface 415 can receive a photocell 420. In certain embodiments, the Zagha socket 115 can comprise the socket 115 of FIG. 2. Additionally, the driver 220 of FIG. 2 can be disposed inside the ring 105-1.

Installing the SPD module on the socket can eliminate the need for opening the luminaire for SPD replacement or maintenance. Moreover, the foregoing can take advantage of standardized sockets 115, such as a NEMA or Zagha socket, already existing on the luminaire without adding extra cost or extra complexity to the luminaire.

Accordingly, the SPD can be installed by twist turn action on an existing luminaire socket connector 115. SPD Module offers same socket interface to install any NEMA 3; 5 or 7 pins or Zagha 4 pins external device on it. All connections required for SPD function and all electrical bridges for external devices are integrated on SPD module.

Accordingly, the foregoing allows for faster maintenance, alleviates the need to open the luminaire to replace SPD, reduce the water infiltration risk, allows for usage with standard sockets, such as NEMA or Zagha, and allows connecting any device with the NEMA or Zagha interface.

Figure 5:
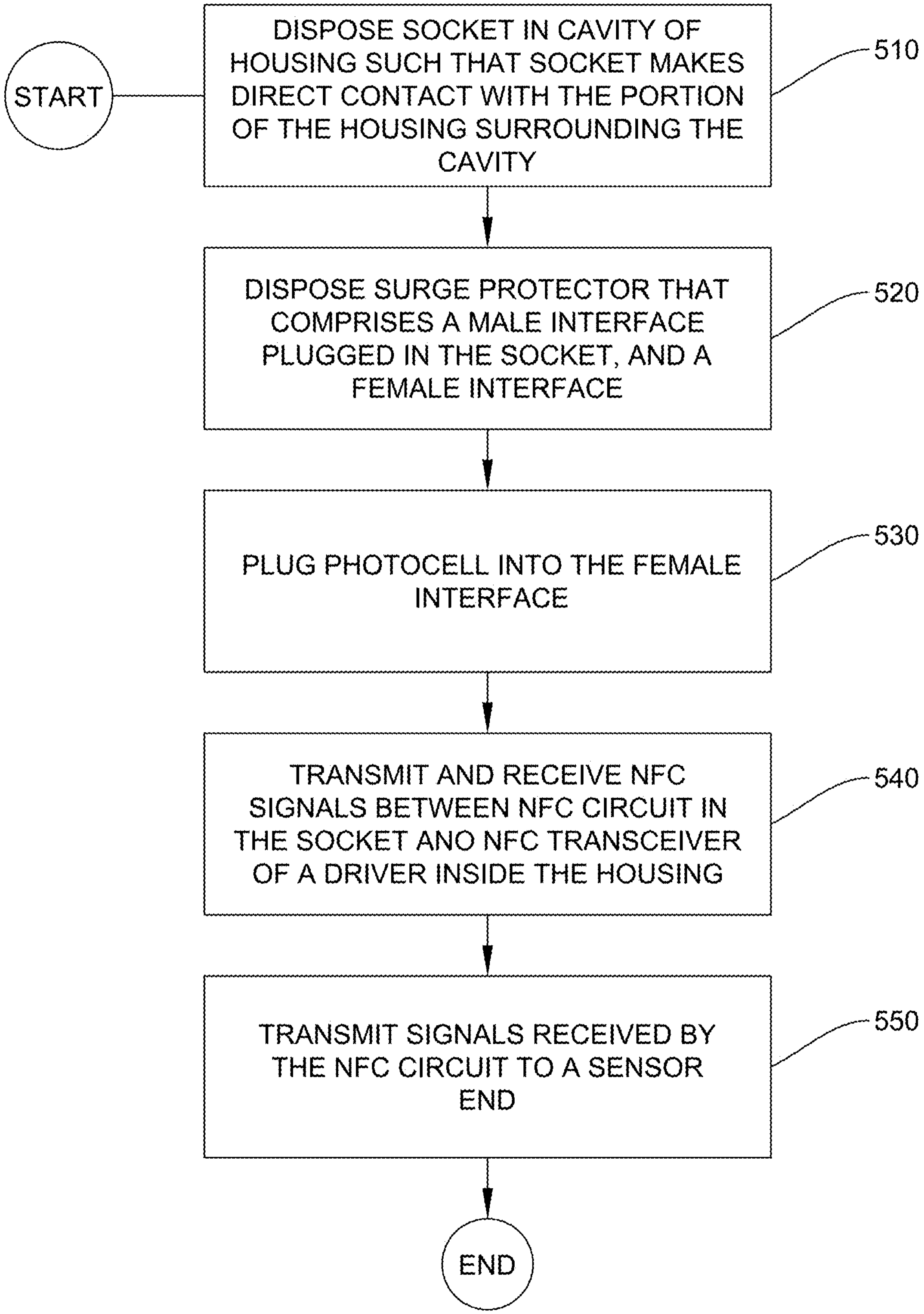
FIG. 5 is flow diagram of a method in accordance with an embodiment of the disclosure.

Referring now to FIG. 5, there is illustrated a method in accordance with an embodiment of this disclosure. At 510 a socket 115 is disposed in a cavity 110 of a ring 105-1, wherein the socket 115 makes direct contact with a portion of the housing surrounding the cavity 110.

In certain embodiments, the socket comprises a NEMA socket 115, the male interface comprises a NEMA male interface 310, and the female interface comprises a NEMA female interface 315, and wherein the NEMA male interface 310 is plugged into the NEMA socket 115.

In certain embodiments, the socket comprises a Zagha Book 18 receptacle 115, the male interface comprises a Zagha male interface 410, and the female interface comprises a Zagha female interface 415, and wherein the Zagha male interface 410 is plugged into the Zagha Book 18 receptacle 115.

At 520, a surge protector 305, 405 is disposed on the socket 115, wherein the surge protector 305, 405 comprises a male interface 310, 410 plugged into the socket 115, and female interface 315, 415.

At 530, a photocell 320, 420 plugged into the female interface 315, 415.

At 540, a Near Field Communication NFC circuit 225 disposed in the socket transmits and receives NFC signals with an NFC transceiver 240 connected to a driver 220 that disposed in the housing 105.

In certain embodiments, the NFC signals induce power to the NFC circuit 225 of the socket 115 from the NFC transceiver 240 connected to the driver 220.

In certain embodiments, the NFC signals further comprise transmitting Digital Addressable Lighting Interface DALI signals transmitted from the NFC transceiver 240 to the NFC circuit 225 of the socket 115.

At 550, signals received by the NFC circuit are transmitted to a sensor 230. For example, the signals can include DALI signals.

According to certain embodiments, an apparatus comprises a housing 105 including a cavity 110, a socket 115 disposed in the cavity 110, wherein the socket 115 makes direct contact with a portion of the housing surrounding the cavity 110, a surge protector 305, 405 disposed on the socket 115, wherein the surge protector 305, 405 comprises a male interface 310, 410 plugged into the socket 115, and a female interface 315, 415, and a photocell 320, 420 plugged into the female interface 315, 415.

According to certain embodiments, the housing 105 and ring 105-1 are formed of injection molded plastic.

According to certain embodiments, the socket comprises a NEMA socket 115, the male interface comprises a NEMA male interface 310, and the female interface comprises a NEMA female interface 315, and the NEMA male interface 310 is plugged into the NEMA socket 115.

According to certain embodiments, the socket comprises a Zagha Book 18 receptacle 115, the male interface comprises a Zagha male interface 410, and the female interface comprises a Zagha female interface 415, and the Zagha male interface 410 is plugged into the Zagha Book 18 receptacle 115.

According to certain embodiments, the socket 115 includes a Zagha interface 215, and a Near Field Communication NFC circuit 225, configured to transmit and receive NFC signals, and the apparatus further comprises a driver 220 disposed in the housing 105, the driver connected to an NFC transceiver 240 configured to transmit and receive signals from the NFC circuit 225 of the socket 115.

According to certain embodiments, the driver has an auxiliary input voltage signal 235, and the NFC transceiver 240 induces power to the NFC circuit 225 of the socket 115.

According to certain embodiments, the NFC transceiver 240 transmits Digital Addressable Lighting Interface DALI signals to the NFC circuit 225 of the socket 115.

According to certain embodiments, the apparatus further comprises a sensor 230, and the NFC circuit 225 of the socket 115 communicates DALI signals received from the NFC transceiver 240 to the sensor 230.

According to certain embodiments, a method comprises disposing 510 a socket 115 in a cavity 110 of a ring 105-1, wherein the socket 115 makes direct contact with a portion of the housing surrounding the cavity 110, disposing 520 a surge protector 305, 405 on the socket 115, wherein the surge protector 305, 405 comprises a male interface 310, 410 plugged into the socket 115, and female interface 315, 415, and plugging 530 a photocell 320, 420 into the female interface 315, 415.

According to certain embodiments, the socket comprises a NEMA socket 115, the male interface comprises a NEMA male interface 310, and the female interface comprises a NEMA female interface 315, and the NEMA male interface 310 is plugged into the NEMA socket 115.

According to certain embodiments, the socket comprises a Zagha Book 18 receptacle 115, the male interface comprises a Zagha male interface 410, and the female interface comprises a Zagha female interface 415, and wherein the Zagha male interface 410 is plugged into the Zagha Book 18 receptacle 115.

According to certain embodiments, the method further comprises transmitting 540 and receiving NFC signals between a Near Field Communication NFC circuit 225 disposed in the socket and an NFC transceiver 240 connected to a driver 220 disposed in the housing 105.

According to certain embodiments, transmitting and receiving NFC signals further comprises inducing power to the NFC circuit 225 of the socket 115 by the NFC transceiver 240 connected to the driver 220.

According to certain embodiments, transmitting and receiving NFC signals further comprises transmitting Digital Addressable Lighting Interface DALI signals from the NFC transceiver 240 to the NFC circuit 225 of the socket 115.

According to certain embodiments, the method further comprises transmitting 550 the DALI signals from the NFC circuit 225 to a sensor 230.

Certain embodiments may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general-purpose computer accesses code for implementing the processing shown herein, the execution of the code transforms the general-purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general-purpose computer accesses code for implementing the processing shown herein, the execution of the code transforms the general-purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In addition, it would be recognized that when a general-purpose computer accesses code for implementing the processing shown herein, the execution of the code transforms the general-purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

While one or more embodiments of the disclosure have been described with reference to the figures, it will be understood by those of ordinary skill in the art that various changes in form and details may be made therein without departing from the spirit and scope as defined by the following claims.

What is claimed is:

1. A luminaire comprising:

a housing including an integrated protruding ring with a cavity;

a socket disposed in the cavity, wherein the socket makes direct contact with a portion of the ring surrounding the cavity, and wherein the socket includes an interchangeable interface;

an external electronic device configured to mate with the socket and utilize the standardized interface; and wherein the protruding ring is configured to receive the external electronic device and wherein the external electronic device is configured to cover at least a portion of the protruding ring to form a seal around the protruding ring to reduce or eliminate water ingress into the socket, without a gasket between the protruding ring and external electronic device.

2. The luminaire of claim 1, wherein the housing is formed of injection molded plastic.

3. The luminaire of claim 1, wherein the socket comprises a National Electronics Manufacturers Association (NEMA) interface, the NEMA interface includes a NEMA male interface, and a NEMA female interface, and wherein the NEMA male interface is plugged into the socket.

4. The luminaire of claim 1, wherein the socket includes:

a Zagha interface; and a Near Field Communication (NFC) circuit, configured to transmit and receive NFC signals; and the apparatus further comprising:

a driver disposed in the housing, the driver connected to an NFC transceiver configured to transmit and receive signals from the NFC circuit of the socket.

5. The luminaire of claim 4, wherein the driver has an auxiliary input voltage signal 2, and wherein the NFC transceiver induces power to the NFC circuit of the socket.

6. The luminaire of claim 5, wherein the NFC transceiver transmits Digital Addressable Lighting Interface (DALI) signals to the NFC circuit of the socket.

7. The luminaire of claim 6, further comprising a sensor, and wherein the NFC circuit of the socket communicates DALI signals received from the NFC transceiver to the sensor.

8. The luminaire of claim 1, wherein the external device is a surge protector, a photocell control, a shorting cap, or a control device.

9. The luminaire of claim 1, wherein the socket is disposed into the cavity by one or more of clipping, ultrasound, glue, and screwing with threads.

* * * * *